US012036775B2

(12) United States Patent  
Konkel et al.

(10) Patent No.: US 12,036,775 B2  
(45) Date of Patent: Jul. 16, 2024

(54) BARRIER FILM

(71) Applicant: INNOVIA FILMS LTD., Wigton (GB)

(72) Inventors: Christopher Konkel, Wigton (GB); Jonathan Hewitt, Wigton (GB)

(73) Assignee: INNOVIA FILMS LTD., Wigton (GB)

( * ) Notice: Subject to any disclaimer, the term of this patent is extended or adjusted under 35 U.S.C. 154(b) by 86 days.

(21) Appl. No.: 17/250,812

(22) PCT Filed: Sep. 12, 2019

(86) PCT No.: PCT/EP2019/074426  
§ 371 (c)(1),  
(2) Date: Mar. 5, 2021

(87) PCT Pub. No.: WO2020/053363  
PCT Pub. Date: Mar. 19, 2020

(65) Prior Publication Data  
US 2021/0323288 A1 Oct. 21, 2021

(30) Foreign Application Priority Data  
Sep. 14, 2018 (GB) ..................... 1814979

(51) Int. Cl.
| | | |
|---|---|---|
| *B32B 27/08* | (2006.01) | |
| *B29C 48/00* | (2019.01) | |
| *B29C 48/08* | (2019.01) | |
| *B29C 48/21* | (2019.01) | |
| *B29C 55/12* | (2006.01) | |
| *B32B 1/00* | (2006.01) | |
| *B32B 27/30* | (2006.01) | |
| *B32B 27/32* | (2006.01) | |
| *B65D 65/40* | (2006.01) | |
| *B29K 23/00* | (2006.01) | |
| *B29L 7/00* | (2006.01) | |

(52) U.S. Cl.  
CPC .......... *B32B 27/08* (2013.01); *B29C 48/0018* (2019.02); *B29C 48/08* (2019.02); *B29C 48/21* (2019.02); *B29C 55/12* (2013.01); *B32B 1/00* (2013.01); *B32B 27/306* (2013.01); *B32B 27/32* (2013.01); *B65D 65/40* (2013.01); *B29K 2023/086* (2013.01); *B29K 2023/12* (2013.01); *B29K 2995/0026* (2013.01); *B29L 2007/008* (2013.01); *B32B 2250/24* (2013.01); *B32B 2250/40* (2013.01); *B32B 2255/10* (2013.01); *B32B 2307/31* (2013.01); *B32B 2307/406* (2013.01); *B32B 2307/412* (2013.01); *B32B 2307/518* (2013.01); *B32B 2307/54* (2013.01); *B32B 2307/704* (2013.01); *B32B 2307/7244* (2013.01); *B32B 2307/734* (2013.01); *B32B 2307/75* (2013.01); *B32B 2439/40* (2013.01); *B32B 2439/70* (2013.01)

(58) Field of Classification Search  
CPC ..... B29C 48/0018; B29C 48/08; B29C 48/21; B29C 55/12; B29K 2023/086; B29K 2023/12; B29K 2995/0026; B29L 2007/008; B32B 1/00; B32B 2250/24; B32B 2250/246; B32B 2250/40; B32B 2255/10; B32B 2255/205; B32B 2255/26; B32B 2307/31; B32B 2307/406; B32B 2307/412; B32B 2307/51; B32B 2307/518; B32B 2307/54; B32B 2307/704; B32B 2307/7244; B32B 2307/732; B32B 2307/734; B32B 2307/75; B32B 2439/40; B32B 2439/70; B32B 2553/00; B32B 27/08; B32B 27/302; B32B 27/306; B32B 27/32; B32B 27/34; B32B 27/36; B32B 3/26; B65D 65/40

See application file for complete search history.

(56) References Cited

U.S. PATENT DOCUMENTS

| | | | |
|---|---|---|---|
| 6,372,359 B1 * | 4/2002 | Hayashi | C08L 23/08 |
| | | | 428/518 |
| 2011/0281096 A1 | 11/2011 | Enzinger et al. | |
| 2018/0207913 A1 * | 7/2018 | Stroeks | B32B 7/12 |

FOREIGN PATENT DOCUMENTS

| | | |
|---|---|---|
| EP | 2 113 378 | 11/2009 |
| JP | 2007-090877 | 4/2007 |
| WO | 96/12616 | 5/1996 |
| WO | 01/42010 | 6/2001 |
| WO | 02/00430 | 1/2002 |
| WO | 2013041469 | 3/2013 |

OTHER PUBLICATIONS

International Preliminary Report on Patentability of International Application No. PCT/EP2019/074426 mailed Mar. 9, 2021.  
International Search Report and Written Opinion of International Application No. PCT/EP2019/074426.

* cited by examiner

*Primary Examiner* — Yan Lan  
(74) *Attorney, Agent, or Firm* — Ping Wang; Kalos Athena Wang PLLC

(57) ABSTRACT

A multi-layer polymeric film substrate comprising at least a core layer and a coextruded oxygen barrier layer wherein the film exhibits an oxygen transmission rate (OTR) when measured in accordance with ASTM F1927-14 of below 200 $cc/m^2/24$ hr at a relative humidity (RH) of 85% and/or of below 600 $cc/m^2/24$ hr at a relative humidity (RH) of 90%.

23 Claims, No Drawings

BARRIER FILM

This application is a national stage application of International Patent Application No. PCT/EP2019/074426, filed Sep. 12, 2019, which claims priority to United Kingdom patent Application No. 1814979.9, filed Sep. 14, 2018. The entirety of the aforementioned applications is incorporated herein by reference.

FIELD

The present invention relates to a multi-layer biaxially orientated polymeric film containing an oxygen barrier layer and to a manufacturing method for such a film.

BACKGROUND

Various materials are known to provide oxygen barrier in flexible polymeric packaging films. For example, EVOH is frequently used as an oxygen barrier layer in packaging structures but suffers from a loss in barrier performance as relative humidity (RH) increases beyond 50-70%. It has been found that biaxial orientation of EVOH can increase the absolute barrier due to elevating its crystallinity as a consequence of the increased molecular alignment. However, loss of barrier at high RH remains apparent in current commercially available samples.

EP2113378 discloses a film with an axially bi-orientated polypropylene (BOPP) base obtained by means of sequential stretching respectively in the machine direction (MD) and in a direction transverse to the machine (TD). The film is suitable to make packings, flexible packages, laminated products and labels, having at least a partial oxygen barrier effect, and is formed by a plurality of layers in which at least one of said layers is a barrier layer with an ethylene vinyl alcohol (EVOH) base. This film appears to have satisfactory oxygen barrier properties at low relative humidity (RH) but its barrier properties fall off markedly at higher RH, of for example 85% or 90%.

US2011281096A1 discloses a barrier film for use in packaging, particularly for the packaging of foods and tobacco, in the form of a multi-layer film based on a biaxially oriented polyolefin film having at least one coextruded functional layer or barrier based on ethylene-vinyl alcohol copolymers (EVOH), which is produced by simultaneous drawing of a coextruded multi-layer primary film. This disclosure provides a detailed summary of the state of the art vis a vis EVOH barrier films before concluding that it is not possible to produce high quality barrier films under conventional drawing conditions. The disclosure teaches drawing temperatures of 145° C. and below, which is below typical temperature conditions for the production of BOPP films. By modifying the processing conditions in this manner the authors claim to be able to produce values for the oxygen permeability at 23° C. and 75% relative humidity (OTR; ASTM 3985) of better than 10 $cm^3/m^2$ dbar, preferably better than 5 $cm^3/m^2$ dbar. However, this disclosure teaches the use of modified polypropylene core layers in order to allow the film to be drawn at such low temperatures. Either blends of polypropylene with a terpolymer or a mini-random polypropylene (having 1.5% ethylene co-polymer content) are used as modified polypropylene. Such modifications complicate the process and can also cause undesirable reduction in film modulus and an increase in shrinkage when compared to a typical BOPP film. Also, there are in any event benefits to drawing at higher temperatures, not least as higher draw temperatures facilitate higher draw ratios. Profile control, film thickness, film optical and tensile properties will all be improved at higher draw temperatures than those taught in this prior art, and of course there are productivity benefits in maintaining draw temperatures at those specifically developed over many years for best practice in film processing.

WO2013041469 discloses a biaxially oriented, multilayer polymer barrier film, having gas barrier properties and comprising a polyolefin core layer and at least one barrier surface layer of ethylene vinyl alcohol (EVOH) on at least one side of the core layer, the barrier layer of EVOH being less than 1.5 pm thick and having an ethylene content of 36 mole-% or lower; and the film having an oxygen transmission (OTR) lower than 10 $cm^3/m^2$/1 day/1 atm, 24 h, 23° C., 50% RH.

WO9612616 discloses a retortable film having at least five layers comprised of: a first and second exterior layer independently comprised of a polymer selected from the group consisting of aliphatic polyamides, aliphatic/aromatic polyamides, and blends thereof; an interior layer selected from the group consisting of an ethylene vinyl alcohol copolymer and a blend of an aliphatic/aromatic polyamide and an ethylene vinyl alcohol copolymer; and an adhesive layer positioned between each exterior layer and the interior layer.

WO0142010 discloses a food package comprising a two piece sealed package including metal free container and peelable lid portions which are readily separable from each other. The container is cup shaped and has a top opening and a substantially flat peripheral rim around the opening. The lid comprises a composite film having a shape which conforms to the shape of the opening and is attached to the rim. The film has a first outer polyamide or polyolefin layer attached to an inner layer of either an ethylene vinyl alcohol copolymer or a blend of a polyamide with an ethylene vinyl alcohol copolymer, which is attached to a second outer polyamide or polyolefin layer.

Consequently, there is a need for barrier packaging which provides good oxygen barrier at even higher % RH, for example at 85 or 90% RH—conditions to which many perishable packaged produce around the world may be subject. There is also a need for barrier packaging which can be manufactured under normal conditions to avoid factory plant reconfiguration between product runs and to allow the best operating conditions for the other aspects of product performance such as clarity, flexibility, sealability and the like.

According to the present invention there is provided a multi-layer polymeric film substrate comprising at least a core layer and a coextruded oxygen barrier layer wherein the film exhibits an oxygen transmission rate (OTR) when measured in accordance with ASTM F1927-14 of below 200 $cc/m^2$/24 hr at a relative humidity (RH) of 85% and/or of below 600 $cc/m^2$/24 hr at a relative humidity (RH) of 90%.

By "polymeric film substrate" we mean a polymeric film in the absence of any sealable skin layer.

The film substrate of the invention preferably exhibits one or more of the following desirable properties:

A modulus of elasticity in the machine direction (MD) of above 1500 $N/mm^2$, preferably above 1750 $N/mm^2$, preferably above 2000 $N/mm^2$, preferably above 2100 $N/mm^2$, more preferably above 2200 $N/mm^2$, still more preferably above 2300 $N/mm^2$, most preferably above 2400 $N/mm^2$, for example above 2500 $N/mm^2$.

A modulus of elasticity in the transverse direction (TD) of above 1500 $N/mm^2$, preferably above 1750 $N/mm^2$, preferably above 2000 $N/mm^2$, preferably above 2100

N/mm², more preferably above 2200 N/mm², still more preferably above 2300 N/mm², most preferably above 2400 N/mm², for example above 2500 N/mm².

Shrinkage in the machine direction (MD) of below 15%, preferably below 12.5%, more preferably below 10%, still more preferably below 7.5%, most preferably below 7%.

Shrinkage in the transverse direction (TD) of below 15%, preferably below 12.5%, more preferably below 10%, still more preferably below 7.5%, most preferably below 7%.

Modulus of elasticity (Young's modulus or 1% Secant Modulus) can be determined in accordance with the invention on either a Shimadzu AGS-X Std tester or an Instron 4301 tester according to ASTM D882-12.

Shrinkage is defined herein as the free shrinkage which is the percentage change in length at a given temperature over a given time (130° C., 60 s) and measured following ASTM method D2732-08.

Preferably the film substrate of the invention exhibits at least two of the above stated desirable properties, and in some cases may exhibit three or even four such properties.

This disclosure expressly contemplates film substrates having any one of the above stated desirable properties in combination with any other such property or properties.

We find that these desirable properties may arise in film substrates in which the core layer of the film comprises a substantially pure isotactic homopolymer.

By "substantially pure" we mean comprising one or more homopolymers, preferably a single homopolymer, blended with less than 1.5%, preferably less than 1.0%, more preferably less than 0.5% and most preferably about 0%, or simply 0% of any copolymer, preferably any other polymer.

We find that the use of substantially pure isotactic polypropylene as the core layer provides particular benefits with regards to the film substrate properties of elasticity modulus and shrinkage than is apparent in relation to films using modified core layers.

Water vapour transmission rate (WVTR) properties of film substrates in accordance with the invention are also superior to those of films made using modified core layers. Preferred values of WVTR for films in accordance with the invention are less than 7 g/m²/24 hr for a 30 micron total film thickness.

In manufacture of the film substrate of the invention it is preferred that the oxygen barrier layer and the core layer have together been simultaneously or sequentially stretched in both the machine and transverse directions of the film to over twenty five times the original areal dimensions of the film pertaining immediately before stretching.

It may be that in manufacture of the film substrate of the invention the oxygen barrier layer and the core layer have together been simultaneously or sequentially stretched in both the machine and transverse directions of the film to over 30 times, over 35 times, over 40 times, over 45 times, over 50 times, over 55 times, or over 60 times the original areal dimensions of the film pertaining immediately before stretching.

It has surprisingly been found that the barrier properties, particularly with respect to oxygen and water vapour, of the inventive film substrates are improved at one or both of 85% and 90% RH when the areal draw is increased beyond 25 and at even higher areal draw ratios.

It has been observed that the barrier properties often reduce as between areal draws of 16 and 25. However, improvements in barrier properties have been found when the areal draw is increased beyond 25 and at even higher areal draw ratios.

Without wishing to be bound by any such theory, it is believed that this may be a function of two different mechanisms for inducing crystallinity in the oxygen barrier layer. A level of crystallinity may be present in the barrier layer initially which is broken down at first as the film substrate is drawn. However, as the drawing increases in intensity (i.e. increased areal draw ratio), further strain-induced crystallinity may become apparent in the oxygen barrier layer.

Preferably simultaneous or sequential stretching of the film takes place at temperatures above 145° C., for example at temperatures of from 145° C. to 170° C.

At the stretching temperature, the oxygen barrier layer may be in a solid (or substantially solid) state i.e. the stretching temperature may be lower than the melting point of the oxygen barrier layer material. For example, where the stretching temperature falls in the range of from 145° C. to 170° C., an EVOH oxygen barrier layer may be in a solid state.

It is very surprising that an oxygen barrier layer can be successfully oriented when subjected to the high areal draw ratios previously mentioned, in the solid state.

Where the oxygen barrier layer is stretched in a solid state, it is preferable that the film is simultaneously stretched.

The film substrate of the invention may be provided with one or more sealable skin layers. The properties of the resulting film as concerns elasticity modulus and/or shrinkage may be modified by the presence of such skin layers, or of one such skin layer.

The oxygen barrier layer of the film or film substrate relies for its oxygen barrier properties, in part, on crystallinity of the material of the oxygen barrier layer. Crystallinity is enhanced by strain (i.e. by stretching of the film or film substrate.) We find that this property of crystallinity is enhanced by simultaneous or sequential stretching of the film or film substrate such that the crystal structure of the predominant material of the oxygen barrier layer is balanced in the machine and transverse directions of the film or film substrate. We further find that the extent of stretching (the draw ratio) is an important feature—insufficient stretching provides inadequate crystallinity. For most materials we find that simultaneous or sequential stretching to more than twenty five times original areal dimension is necessary to produce a film or film substrate which exhibits the desired barrier properties at high % RH.

Accordingly the invention provides a multi-layer polymeric film or film substrate in accordance with the above wherein the crystal structure of the oxygen barrier layer is balanced in the machine and transverse directions of the film.

The invention also provides a multi-layer polymeric film or film substrate as described herein wherein the oxygen barrier layer exhibits balanced strain-induced crystallinity.

By "balanced" we mean not materially or markedly different.

Preferably, in manufacture of the film substrate of the invention the oxygen barrier layer and the core layer have together been subjected to a balanced machine and transverse direction draw, either simultaneously or sequentially, to more than 25 times the original areal dimensions (i.e. a draw ratio of higher than 5×5), more preferably to 36 or more times the original areal dimensions (i.e. a 6×6 or higher draw ratio), more preferably to 49 or more times the original areal dimensions (i.e. a 7×7 or higher draw ratio), of the film pertaining immediately before stretching.

Each material will be different and there are a variety of barrier materials the skilled addressee is known to choose from when selecting for barrier properties. EVOH is a preferred material for the oxygen barrier layer and benefits from >20× original areal stretch in terms of its resultant balanced crystallinity giving rise to oxygen barrier properties which are impervious too, or at least not unacceptably compromised by, high % RH of 85% or 90%, for example.

We have found in some cases that the oxygen barrier properties of the film or film substrate of the invention are significantly improved at high RH (e.g. 85% or 90%) with respect to commercially available and tested samples of biaxially oriented polypropylene (BOPP) films containing an EVOH barrier layer which are made by means of a sequential stretching process. We have shown that by orienting the oxygen barrier layer and the core layer simultaneously in the machine and transverse directions of the film or film substrate and by more than twenty five times the original areal dimension of the film or film substrate the sensitivity of the film oxygen barrier properties to % RH is significantly reduced.

The core layer may contribute predominantly towards the thickness of the film or film substrate, by which may be meant the (or each combined) core layer is the thickest single layer in the film or film substrate, and/or that the thickness of the (or each combined) core layer is thicker than the other layers of the film or film substrate in combination. Often the (or each combined) core layer comprises over 70%, preferably over 75%, 80%, 85% or 90%, over 95% or over 97.5% of the total film or film substrate thickness. However the invention also concerns film structures having thick hermetic sealing layers, and the core layer thickness in such films may be significantly lower, for example as low as around 30%, 35%, 40%, 45% or 50% of the overall film thickness.

The film or film substrate core layer may comprise a polyolefin film, for example polyethylene, polypropylene, mixtures thereof, and/or other known polyolefins. The polymeric film or film substrate can be made by any process known in the art, including, but not limited to, cast sheet, cast film and blown film. The film or film substrate core layer may be of monolayer or of multi-layer construction. This invention may be particularly applicable to films or film substrates comprising cavitated or non-cavitated polypropylene films, with a polypropylene core and skin layers (sealing and/or laminating layers) with a thickness substantially below that of the core layer and formed for example from co-polymers of ethylene and propylene or terpolymers of propylene, ethylene and butylene. As intimated above, the invention also pertains to films comprising cavitated or non-cavitated polypropylene films, with a polypropylene core and thick hermetic sealing skin layers which may have a thickness of the same order of magnitude as that of the core layer.

The film or film substrate may comprise a biaxially orientated polypropylene (BOPP) film. Films of the invention are prepared as balanced films or film substrates using substantially equal machine direction and transverse direction stretch ratios. Simultaneous stretching, for example using the so-called bubble process, is preferably used to obtain the desired properties of the invention although controlled sequential stretching may also be used.

Alternatively, the film or film substrate core layer may comprise a polyester film, a polyamide film, polystyrene film, and any biobased alternatives for example, and compatible mixtures or blends of two or more such materials. The core layer may itself comprise multiple layers of the same or different materials.

The core layer may be non-cavitated, or non-pigmented. Alternatively the core layer may be cavitated or pigmented, or cavitated and pigmented if an opaque film or film substrate is desired.

The OTR of the film or film substrate when measured in accordance with ASTM F1927-14 and standardized to a EVOH (Barrier) layer thickness of 2.0 microns may be below 175 cc/m$^2$/24 hr at a relative humidity (RH) of 85%, below 150 cc/m$^2$/24 hr at a relative humidity (RH) of 85%, below 125 cc/m$^2$/24 hr at a relative humidity (RH) of 85%, below 100 cc/m$^2$/24 hr at a relative humidity (RH) of 85%, below 75 cc/m2/24 hr at a relative humidity (RH) of 85%, below 50 cc/m$^2$/24 hr at a relative humidity (RH) of 85%, below 30 cc/m$^2$/24 hr at a relative humidity (RH) of 85%, below 600 cc/m$^2$/24 hr at a relative humidity (RH) of 90%, below 500 cc/m$^2$/24 hr at a relative humidity (RH) of 90%, below 400 cc/m$^2$/24 hr at a relative humidity (RH) of 90%, below 300 cc/m$^2$/24 hr at a relative humidity (RH) of 90%, below 200 cc/m$^2$/24 hr at a relative humidity (RH) of 90%, below 100 cc/m$^2$/24 hr at a relative humidity (RH) of 90%, and/or below 50 cc/m$^2$/24 hr at a relative humidity (RH) of 90%

Typically the barrier films or film substrates of the invention may be transparent and are required to have good optical properties suitable for use in packaging applications. They may exhibit wide angle haze (WAH) values of less than about 5, less than about 4, less than about 3, less than about 2, less than about 1 or less than 0.9, for example. The films of the invention may have gloss values (at 45°) of at least about 75, at least about 80, at least about 85 or at least about 90.

The barrier layer may be adjacent the core layer or there may be provided one or more film or film substrate layers (for example one or more tie layers) intervening the barrier layer and the core layer.

The oxygen barrier layer may comprise EVOH in which case the ethylene content of the EVOH in the barrier layer is usually from about 20% to about 50%, for example from about 20% to about 40% or from about 20% to about 35% by weight EVOH in the barrier layer. PVOH may also be used as the material of the oxygen barrier layer, as may blends of 2 or more different EVOH and/or PVOH materials.

The thickness of the barrier layer may be selected with reference to the desired barrier properties of the film and will generally be in the range of from about 0.1 μm to about 5 μm.

The films and film substrates of the invention will commonly find application in the packaging of articles of commerce, for example in food packaging.

According to the present invention there is a provided a sealed package formed at least in part from a barrier film or film substrate in accordance with the invention.

Also provided in accordance with the invention is an article of commerce wrapped or packaged in a material comprising the film or film substrate of the invention.

The film or film substrate core layer or the other layer(s) of the film may comprise additional materials such as anti-block additives, opacifiers, fillers, UV absorbers, cross-linkers, colourants, waxes and the like.

The films or film substrates used in accordance with the present invention can be of a variety of thicknesses according to the application requirements. For example, they can be from about 10 to about 240 μm thick and will generally be from about 15 to about 90 μm thick.

Sealable or printable skin layers of the film may be provided and may have a thickness of from about 0.2 μm to about 3 μm, from about 0.3 μm to about 2.5 μm, from about 0.5 μm to about 2.0 μm, or from about 1.0 μm to about 2.0 μm. In some cases thicker hermetic sealing skin layers may be used and these may have a thickness of from 2 μm to 15 μm, from 3 μm to 12 μm, from 4 μm to 11 μm or from 5 μm to 10 μm.

In some embodiments of the invention it may be desirable to provide the film with a functional and/or aesthetic coating.

In a preferred embodiment of the invention, the film or film substrate is provided on at least one of its surface layers with a printable coating.

The coated film or film substrate of the invention is suitably manufactured by means of a coating dispersion applied to a film. The dispersion used to coat the film or film substrate may contain about 15-70% solids, for example 20-60% solids, or 25 to 50% solids, in order to achieve satisfactory film forming properties. The film or film substrate formed should be uniform and continuous.

The dispersion may be coated onto the surface of the film or film substrate and dried using any suitable conventional technique. The coating composition may be applied by any other number of well known techniques, such as dip coating, rod coating, blade coating, air knife coating, gravure coating and reverse roll coating, extrusion coating, slide coating, curtain coating, and the like. After coating, the coating layer is generally dried by simple evaporation, which may be accelerated by known techniques such as convection heating. The dispersion is preferably applied using a gravure process, and the drying step carried out in an oven. The drying of the coated dispersion removes water from the dispersion leaving a uniform continuous film or film substrate with any non-film forming particles dispersed in the film or film substrate.

The coating may be an acrylic coating.

The film or film substrate of the invention may be further treated, by corona discharge treating for example, further to improve ink receptivity of the film or of a skin layer or coating of the film or film substrate.

The film or film substrate may have a vacuum deposited layer such as aluminium or aluminium oxide or silicon oxide.

The film or film substrate of the invention may also incorporate one or more functional and/or aesthetic additives. Suitable additives may be selected from one or more of the following, mixtures thereof and/or combinations thereof: UV absorbers, dyes; pigments, colorants, metallised and/or pseudo-metallised coatings; lubricants, anti-static agents (cationic, anionic and/or non-ionic, e.g. poly-(oxyethylene) sorbitan monooleate), anti-oxidants (e.g. phosphorous acid, tris (2,4-di-tert-butyl phenyl) ester), surface-active agents, stiffening aids, slip aids (for example hot slips aids or cold slip aids which improve the ability of a film to slide satisfactorily across surfaces at about room temperature, e.g. micro-crystalline wax; gloss improvers, prodegradants, barrier coatings to alter the gas and/or moisture permeability properties of the film (such as polyvinylidene halides, e.g. PVdC); anti-blocking aids (for example microcrystalline wax, e.g. with an average particle size from about 0.1 to about 0.6 μm); tack reducing additives (e.g. fumed silica, silica, silicone gum); particulate materials (e.g. talc); additives to increase COF (e.g. silicon carbide); additives to improve ink adhesion and/or printability; additives to increase stiffness (e.g. hydrocarbon resin); additives to increase shrinkage (e.g. hard resin)

Some or all of the additives listed above may be added together as a composition to coat the films or film substrates of the present invention and/or form a new layer which may itself be coated and/or may form the outer or surface layer of the film or film substrate. Alternatively, some or all of the preceding additives may be added separately and/or incorporated directly into the bulk of the core layer optionally during film or film substrate formation (e.g. as part of the original polymer composition), and thus they may or may not form layers or coatings as such.

As will be apparent the film or film substrate of the invention exhibits improved properties with respect to oxygen barrier at high RH % by virtue of simultaneous or sequential stretching of the film in its machine and transverse directions. Consequently the invention further provides a method for manufacturing a barrier film or film substrate comprising coextruding a core layer and an oxygen barrier layer, and simultaneously or sequentially stretching the coextruded film or film substrate in both its machine and transverse directions to more than twenty five times its original areal dimensions to produce a film which exhibits an oxygen transmission rate (OTR) when measured in accordance with ASTM F1927-14 of below 200 cc/m$^2$/24 hr at a relative humidity (RH) of 85%.

The invention will now be more particularly described with reference to the following examples.

EXAMPLES

Test Methods

Details of the test methods used in these Examples are as follows:

| Test Types | Method |
| --- | --- |
| Optical Properties Testing | |
| Gloss | ASTM D2457-13 |
| Narrow Angle Haze | Internal Innovia Method |
| Wide Angle Haze | Based on ASTM D1003-13 |
| Physical Properties Testing | |
| Tensile Properties | Based on ASTM D882-12 |
| Shrinkage | Based on ASTM D2732-08 |
| Barrier Properties Testing | |
| Oxygen Barrier at 0% RH | Based on ASTM D3985-05 (2010)e1 & ASTM D3985-17 |
| Oxygen Barrier at Elevated RH | Based on ASTM F1927-14 |
| WVTR Testing/Barrier | Based on ASTM F1249-13 |

Physical Properties

Thickness

Sample thickness is measured on a calibrated Mercer 1220DM or 122 thickness gauge taking the average over the applicable parts of the sample. Alternatively, sample thickness is measured using a calibrated microscope to image a film section (thin films are cut as produced or can be embedded in a polymeric material cured at 60° C. overnight to ease sectioning of a flexible film, using a Leica semi-motorised microtome fitted with either a diamond knife or disposable blade), image taken using a Zeiss axio M2m imager compound light microscope (using reflected bright field light under the ×20 and ×50 objectives lenses) the image generated allows us to knowledge of both EVOH layer thickness and also overall film thickness.

Shrinkage (Free)

Based on ASTM D2732. A minimum of 3 samples of film are cut in both direction 1 and direction 2 (equivalent of MD & TD in pilot and production plant produced films) to 10 mm wide strips using a calibrated twin bladed cutter. These samples were then marked at distances over 10 cm and placed in a shrinkage frame. The frame was then subjected to the temperature of shrinkage (in a preheated Swallow Shrinkage Oven with LTE Scientific Temperature Controller) for 60 second before being removed and measured. Percentage shrinkage was calculated from the change in length versus original length and averaged over the number or samples.

Tensile Tests

Based on ASTM D882. Samples of film substrate are cut to 25 mm wide strips using a calibrated twin blade Guillotine (or twin bladed cutter). These strips are then cut to the required size using a calibrated grid underlay and Stanley knife (with new blade). For Plant/Laboratory scale samples—3 specimens of each sample are cut in both direction 1 & 2 (equivalent of sampling in the MD and TD in plant samples). These samples are then set up and drawn at room temperature on either a Shimadzu AGS-X Std tester or an Instron 4301 tester, draw forces are recorded under conditions outlined in the ASTM method and results recorded.

Optical Properties

Gloss

Gloss measurements are taken based on ASTM D2457. Gloss results are recorded at 45° using a calibrated unit either using a Novo-gloss Lite unit calibrated to a zero reference and then set on a black back ground of known reflectance or a NovoGloss 45° Rhopoint meter. The unit is regularly tested against both the supplied calibrated block and the background to black sheet. Results are taken over a sample and reported as an average of 3 tests.

Wide Angle Haze (WAH)

Testing is based on ASTM D1003. WAH of a specimen is the percentage of transmitted light which, in passing through the specimen, deviates from the incident beam by more than 2.5 degrees by forward scattering. WAH results are recorded at using a pre calibrated unit (Hazemeter M57 and Spherical Hazemeter from Diffusion Systems) each variant is tested 3 times across the sample web and an average result recorded.

Narrow Angle Haze (NAH)

NAH of a specimen is the parallel light which is scattered by more than 6 minutes (0.1°) of an arc when passing through the film or film substrate sample from the incident beam, and is measured as a percentage of total light transmitted through the film. Results are recorded using a pre calibrated "Rayopp" laser haze meter and recorded over the length of a 25 mm wide film strip, recording both the maximum and minimum results achieved over the sample.

Barrier Testing

Oxygen Barrier 0% RH

Based on ASTM D3985. Testing is carried out with 2 replicates of each sample, these materials are run under standard conditions and results for the given film or film substrate sample recorded as average of these results. For multilayer samples the sample is sectioned and the thickness of the barrier layer and film determined by microscopy otherwise the film thickness is recorded using a calibrated micrometer.

Oxygen Barrier Variable RH

Based on ASTM F1927. Testing is carried out with 2 replicates of each sample, these materials are run under the set RFI conditions and results for the given film or film substrate sample recorded as average of these results. For multilayer samples the sample is sectioned and the thickness of the barrier layer and film or film substrate determined by microscopy otherwise the film thickness is recorded using a calibrated micrometer.

Processing

Drying of Samples

Drying of samples before processing on extruders is carried out using either a fluidised bed dryer from Christison or a Dri Air Drier model ARTD-X100 using conditions recommended by the relevant supplier when required.

Stretching

Samples are stretched on a Karo IV stretcher under conditions shown in the experimental section in all cases the oven is allowed between 30 minutes and 1 hour to equilibrate at the desired temperature and samples are stretched at 181% rate unless otherwise noted.

Comparative (Sequentially Drawn) Example

A multilayer barrier sequentially drawn BOPP film substrate comprising an oxygen barrier layer produced by Taghleef Industries SPA (film marketed as Extendo XTMU) was sourced from the market place and analysed, the results being reported below. It is believed that this film was manufactured broadly in accordance with the disclosure of EP2113378.

Simultaneously Oriented Film Sample Production

Details of the individual components of the film substrates referenced below are listed in Table 1:

TABLE 1

| Materials Used | | | |
|---|---|---|---|
| Range | Code | Producer | Polymer Type |
| Moplen | HP4220 | LyondellBasell | PP homopolymer |
| DuPure | M10050 | Ducor | PP homopolymer |
| Admer | 1179 | Mitsui | Maleic Anhdrydide PP + elastomers |
| EVAL | SP521 | Kuraray | EVOH 27% Ethylene Content |
| EVAL | SP482 | Kuraray | EVOH 32% Ethylene Content |
| G-SoarnoL | GC3304 | Nippon Gohsei | EVOH 33% Ethylene Content |
| EVAL | SP292 | Kuraray | EVOH 44% Ethylene Content |

Lab Scale Samples

Cast sheet samples were produced using a Dr Collins 5-layer cast film line. The multilayer extrusion system was configured to give a sheet layer structure ABCBA. Where the A layer is polypropylene, B layer is a tie layer and the C layer is EVOH.

Extrusion was carried out with the die at 235° C. and extruders increasing in temperature from the first zone at 190° C. to 230° C. The extrudate was cast onto chilled rollers at 30-36° C. and an approximately 1 mm thick cast sheet produced.

The cast sheet samples were then cut into square plaques, which were then simultaneously drawn biaxially to a produced a thin film substrate using a Bruckner Karo IV film stretching machine using the conditions shown in the Table 2.

TABLE 2

Experimental Conditions for Laboratory Scale Work

| Sample | OXYGEN BARRIER Type | Average OXYGEN BARRIER Layer Thickness (microns) | Draw Ratio | Draw Temp ° C. | Preheat Time (sec) | Final Film Substrate Thickness (microns) |
|---|---|---|---|---|---|---|
| Comparative | * | 1.8 | * | * | N/A | 30 |
| Lab 1 | SP482 | 2.5 | 7 × 7 | 156 | 30 | 15.5 |
| Lab 2 | SP521 | 2.8 | 7 × 7 | 156 | 30 | 18.5 |
| Lab 3 | GC3304 | 4.0 | 7 × 7 | 156 | 60 | 25 |

*not specified

Pilot Scale Samples

A pilot trial was carried out on a pilot double bubble biaxial orientation line. Comprising coextrusion and quenching, followed by reheating and orientation of the generated cast tube. Simultaneous orientation of the tube occurs under the action of internal air 5 pressure (TD) and differential nips (MD).

Extrusion was carried out between 210-230° C., with the die set to 220° C. and the die lip at 210° C. The cast tube was then chilled simultaneously internally and externally to control the level of crystallinity. The cast tube was then fed to the top of the orientation tower, 0 reheated and blown under the conditions itemized in Table 3 below:

TABLE 3

Experimental Conditions for Pilot Trials

| Sample | OXYGEN BARRIER Type | Average OXYGEN BARRIER Layer Thickness (microns) | Draw Ratio | Draw Temp ° C. | Final Film Substrate Thickness (microns) |
|---|---|---|---|---|---|
| Comparative | * | 1.8 | * | * | 30 |
| Pilot 1 | SP482 | 2.0 | 6.5 × 6.5 | 148 | 16.7 |
| Pilot 2 | GC3304 | 1.4 | 6.5 × 6.5 | 148 | 18.4 |
| Pilot 3 | GC3304 | 1.2 | 6.5 × 6.5 | 148 | 18.9 |

*See Sequentially Drawn Sample Introduction for Information

The theoretical structure of the resulting film substrates (lab and pilot scale Examples) was as follows in Table 4:

TABLE 4

Film Structures

| Sample | Outer Core Layer (A) Material | Wt. % | Tie Layer (B) Material | Wt. % | Barrier Layer (C) Material | Wt. % | Tie Layer (B) Material | Wt. % | Outer Core Layer (A) Material | wt. % Structure |
|---|---|---|---|---|---|---|---|---|---|---|
| Lab 1 | HP420M | 36 | Admer 1179 | 8 | SP482 | 11 | Admer 1179 | 8 | HP420M | 36 |
| Lab 2 | HP420M | 36 | Admer 1179 | 8 | SP521 | 11 | Admer 1179 | 8 | HP420M | 36 |
| Lab 3 | HP420M | 38 | Admer 1179 | 6 | GC3304 | 11 | Admer 1179 | 6 | HP420M | 38 |
| Pilot 1 | HP420M | 38 | Admer 1179 | 6 | SP482 | 12 | Admer 1179 | 6 | HP420M | 38 |
| Pilot 2 | HP420M | 39 | Admer 1179 | 6 | GC3304 | 10 | Admer 1179 | 6 | HP420M | 39 |
| Pilot 3 | HP420M | 38 | Admer 1179 | 6 | GC3304 | 12 | Admer 1179 | 6 | HP420M | 38 |

* Wt. % refers to the percent by weight of the Material relative to the whole film substrate structure.

All film substrates of the examples were subjected to optical testing under standard conditions, with the results being presented in Table 5 below:

TABLE 5

Optical Properties

| Sample | OXYGEN BARRIER Type | OXYGEN BARRIER Layer Thickness (microns) | Final Film Substrate Thickness (microns) | Gloss 45° | WAH % | NAH mmn | NAH max |
|---|---|---|---|---|---|---|---|
| Comparative. | * | 1.8 | 30 | 90.5 | 3 | 1.3 | 2.3 |
| Lab 1 | SP482 | 2.5 | 15.5 | 71.7 | 4.3 | 34.4 | 42.0 |
| Lab 2 | SP521 | 2.8 | 18.5 | 91.6 | 2.1 | 14.1 | 29.1 |
| Lab 3 | GC3304 | 4.0 | 25 | 97.9 | 1.1 | 7.8 | 12.7 |
| Pilot 1 | SP482 | 2.0 | 16.7 | 88.5 | 0.5 | 1.2 | 7.5 |
| Pilot 2 | GC3304 | 1.4 | 18.4 | 89.9 | 1 | 0.4 | 3.2 |
| Pilot 3 | GC3304 | 1.2 | 18.9 | 79.9 | 0.6 | 0.2 | 1.4 |

* not specified

All film substrate samples were subjected to oxygen barrier testing at varying levels of % RH with the results presented in Table 6 below:

TABLE 6

Barrier Results—ASTM Test Method D3985-17 & F1927-14

| Sample | OXYGEN BARRIER Thickness (μm) | Oxygen Transmission Rate (cm³/m²/24 hr) at % RH | | | | | Film Substrate Thickness (μm) |
|---|---|---|---|---|---|---|---|
| | | 0 | 50 | 70 | 85 | 90 | |
| Comparative | 1.8 | 2.5 | 2.3 | 13 | 260 | 760 | 30 |
| Lab Samples | | | | | | | |
| Lab 1 | 2.5 | 14 | 7.6 | 14.5 | 29 | — | 15 |
| Lab 2 | 2.8 | 2.5 | 1.5 | 2.2 | 5.9 | — | 20 |
| Lab 3 | 4.0 | — | 1 | — | 11 | — | 25 |
| Pilot-Plant Samples | | | | | | | |
| Pilot 1 | 2.0 | 8.6 | 4.9 | 9.4 | 27 | 31 | 23.4 |
| Pilot 2 | 1.4 | 6.1 | 2.5 | 5.5 | 27 | 49 | 19.7 |
| Pilot 3 | 1.2 | 3.2 | 4.7 | 9.5 | 24 | 44 | 15.3 |

It will be seen that the film substrates of the invention exhibit substantially improved oxygen barrier performance with respect to the prior art sequentially stretched film substrate at higher levels of % RH.

The Effect of Draw Ratio

The effect of draw ratio on barrier properties as explored.

Cast sheet samples were produced using a Dr Collins 5-layer cast film line. The multilayer extrusion system was configured to give a sheet layer structure ABCBA. Where the A layer is polypropylene, B layer is a tie layer and the C layer is EVOH.

Extrusion was carried out with the die at 235° C. and extruders increasing in temperature from the first zone at 190° C. to 230° C. The extrudate was cast onto chilled rollers at 30-36° C. and an approximately 1 mm thick cast sheet produced.

The cast sheet samples were then cut into square plaques, which were then simultaneously drawn biaxially at different draw ratios with a preheat time of 50 seconds and a draw temperature of 156° C.) to produce a thin film substrates using a Bruckner Karo IV film stretching machine.

The barrier properties of these film substrates are summarised in Table 7.

TABLE 7

Lab Scale—Barrier Results Standardised to a 2.0 micron EVOH Barrier layer—ASTM Test Method D3985-17 & F1927-14

| Sample Description & Draw Ratio | Oxygen Transmission Rate (cm³/m²/24 hr) | | | EVOH | EVOH Thickness | Barrier with Thickness Correction average 2 micron | | |
|---|---|---|---|---|---|---|---|---|
| | 50% RH | 85% RH | 90% RH | | | 50% RH | 85% RH | 90% RH |
| Lab 4 4 × 4 | 0.8 | 6 | 12 | SP482 | 10.0 | 4.00 | 30.00 | 60.00 |
| Lab 4 5 × 5 | 1.3 | 10 | 17 | | 8.0 | 5.22 | 40.18 | 68.31 |
| Lab 4 6 × 6 | 2 | 12 | 28 | | 5.0 | 5.00 | 30.00 | 70.00 |
| Lab 4 7 × 7 | 2.9 | 12 | 26 | | 4.1 | 5.95 | 24.60 | 53.30 |
| Lab 5 4 × 4 | 0.2 | 1.9 | 4.1 | SP521 | 8.0 | 0.80 | 7.60 | 16.40 |
| Lab 5 5 × 5 | 0.2 | 2.1 | 4.6 | | 7.0 | 0.70 | 7.35 | 16.10 |
| Lab 5 6 × 6 | 0.4 | 2.6 | 6.6 | | 8.0 | 1.60 | 10.40 | 26.40 |
| Lab 5 7 × 7 | 0.5 | 4.1 | 7.5 | | 3.9 | 0.98 | 8.00 | 14.63 |
| Lab 6 4 × 4 | 3.9 | 14 | 21 | SP292 | 10.0 | 19.50 | 70.00 | 105.00 |
| Lab 6 5 × 5 | 5.9 | 22 | 35 | | 6.0 | 17.70 | 66.00 | 105.00 |
| Lab 6 6 × 6 | 7.7 | 27 | 40 | | 5.0 | 19.25 | 67.50 | 100.00 |
| Lab 6 7 × 7 | 11 | 38 | 64 | | 3.2 | 17.60 | 60.80 | 102.40 |
| Lab 7 4 × 4 | 0.3 | 2.2 | 5.3 | GC3304 | 10.0 | 1.50 | 11.00 | 26.50 |
| Lab 7 5 × 5 | 0.4 | 5.4 | 11 | | 8.0 | 1.60 | 21.60 | 44.00 |
| Lab 7 6 × 6 | 0.6 | 6.2 | 15 | | 6.0 | 1.80 | 18.60 | 45.00 |
| Lab 7 7 × 7 | 0.9 | 8.7 | 23 | | 3.6 | 1.62 | 15.66 | 41.40 |

It will be seen that when corrected for thickness of EVOH layer, the barrier properties of the inventive film substrates are improved at one or both of 85% and 90% RH when the areal draw is increased beyond 25 or beyond 36. This is counterintuitive since often the barrier properties reduce as between areal draws of 16 and 25 suggesting that barrier properties will continue to reduce as draw ratios become higher. This turns out not to be the case. We speculate that this may be a function of two different mechanisms for inducing crystallinity in the oxygen barrier layer. A level of crystallinity may be present in the barrier layer initially which is broken down at first as the film substrate is drawn. However, as the drawing increases in intensity (i.e. increased areal draw ratio), further strain-induced crystallinity may become apparent in the oxygen barrier layer.

The same samples were assessed for WVTR, with the results presented in Table 8.

TABLE 8

Lab Scale—WVTR Barrier Results—ASTM Test Method ASTM F1249-13

| Sample Description | EVOH Type | Orientation Temp | OTR @ 50% RH ($cm^3/m^2/24$ hrs) | Thickness microns | | WVTR ($g/m^2/24$ hrs) |
|---|---|---|---|---|---|---|
| | | | | EVOH Layer | Film Layer | |
| Lab 4 7 × 7 | SP482 | 156 | 2.9 | 4.1 | 23 | 5.6 |
| Lab 5 7 × 7 | SP521 | 156 | 0.5 | 3.9 | 19 | 5.7 |
| Lab 6 7 × 7 | SP292 | 156 | 11 | 3.2 | 21 | 6.3 |
| Lab 7 7 × 7 | GC3304 | 156 | 0.9 | 3.6 | 22 | 5.2 |

The effect of draw ratio was further investigated in production scale studies on a double bubble biaxial orientation line. Extrusion was carried out with all extruders except the EVOH layer between 210-265° C., with the die set to 245° C. and the EVOH extruder at 190-230° C. The cast tube was then chilled simultaneously internally and externally to control the level of crystallinity. The cast tube was then reheated and blown under standard BOPP orientation conditions (150-160° C.). In each case the EVOH used was SP482. The draw ratio for each sample was 8.0×8.05 and the results are presented in Table 9. The overall film structure is the form ABCDCBA. Where the A layer is a thin heat seat layer, B is a polypropylene (approx. 75% of Total Structure), C layer is a tie layer (approx. 14% of Total Structure) and the D layer is EVOH (approx. 10% Total Structure).

TABLE 9

Production Scale (Plant)—Barrier Results Standardised to a 2.0 micron EVOH Barrier layer- ASTM Test Method D3985-17 & F1927-14

| | Ave. Thickness in Microns from Microscopy | | Oxygen Transmission Rate @ 23° C. ($cm^3/m^2/hr$) | | | |
|---|---|---|---|---|---|---|
| | | | OTR @ EVOH Thickness | | Barrier with Thickness Correction average 2 microns | |
| | Sections | | 50% | 85% | 50% | 85% |
| Sample | EVOH Layer | Film Substrate | RH Ave. | RH Ave. | RH Ave. | RH Ave. |
| Plant 1 | 2.9 | 26.8 | 3.9 | 17 | 5.66 | 24.65 |
| Plant 2 | 2.9 | 27.3 | 4.3 | 17 | 6.24 | 24.65 |
| Plant 3 | 2.8 | 27.3 | 4.6 | 18 | 6.44 | 25.20 |
| Plant 4 | 2.6 | 24.3 | 4.9 | 21 | 6.37 | 27.30 |

It will be apparent that the OTR performance of the film substrate of the invention is maintained at production (Plant) scale in comparison with our findings at lab scale, despite the areal draw ratio being even higher (8×8.05 compared with a maximum of 7×7 at lab scale).

The effect of draw ratio was further investigated in production scale studies on a double bubble biaxial orientation line. Extrusion was carried out with all extruders except the EVOH layer between 210-265° C., with the die set to 245° C. and the EVOH extruder at 190-230° C. The cast tube was then chilled simultaneously internally and externally to control the level of crystallinity. The cast tube was then reheated and blown under standard BOPP orientation conditions (150-160° C.). In each case the EVOH used was SP482. The draw ratio for each sample was 8.0×8.0 and the results are presented in Tables 10 & 11. The overall film structure is the form ABCDCBA. Where the A layer is a thin heat seat layer, B is a polypropylene (approx. 75% of Total Structure), C layer is a tie layer (approx. 14% of Total Structure) and the D layer is EVOH (approx. 10% Total Structure).

TABLE 10

Production Scale—Optics, Barrier Results EVOH Barrier layer—ASTM Test Method D3985-17 & F1927-14 & Shrinkage results ASTM D2732-08

| Sample | Optics | | | | | | EVOH Thickness Microscope Sections | OTR Barrier @ 50% RH, 23° C. ($cm^3/m^2/24$ hr) | Shrinkage 130° C. | |
|---|---|---|---|---|---|---|---|---|---|---|
| | 45° Gloss, NDT | 45° Gloss, DT | WAH | NAH Low | High | Clarity | | | MD | TD |
| Plant 5 | 93.2 | 94.3 | 1.5 | 9.2 | 11.1 | 94.1 | 2.5 | 6.0 | 6.33 | −0.25 |
| Plant 6 | 93.8 | 94.0 | 1.5 | 8.3 | 10.2 | 93.7 | 2.6 | 4.8 | 6.88 | −0.25 |
| Plant 7 | 93.4 | 92.4 | 1.6 | 9.1 | 10.7 | 93.6 | 3.1 | 3.4 | 7.01 | 0.33 |
| Plant 8 | 93.5 | 94.0 | 1.5 | 11.1 | 13.2 | 92.4 | 3.5 | 3.3 | 6.59 | 0.75 |

TABLE 11

Production Scale—Tensile Results—ASTM Test Method D882-12

| Sample | Youngs Modulus (Mpa) | Secant Modulus (Mpa) | 1% Ten Str (Mpa) | Elong @ brk (%) | Max Load (N) | Load @ brk (N) | Thickness (μm) |
|---|---|---|---|---|---|---|---|
| Tensiles, MD | | | | | | | |
| Plant 5 | 2707 | 2701 | 227.4 | 63.69 | 158.4 | 158.4 | 27.9 |
| Plant 6 | 2965 | 2940 | 226.7 | 60.43 | 157.3 | 157.3 | 27.8 |
| Plant 7 | 2876 | 2937 | 225.4 | 56.46 | 153.5 | 152.3 | 27.2 |
| Plant 8 | 2988 | 3045 | 228.0 | 50.51 | 148.4 | 144.8 | 26.0 |
| Tensiles, TD | | | | | | | |
| Plant 5 | 2505 | 2378 | 172.5 | 104.89 | 119.8 | 119.8 | 27.8 |
| Plant 6 | 2405 | 2254 | 153.7 | 90.75 | 106.4 | 106.4 | 27.7 |
| Plant 7 | 2448 | 2308 | 165.4 | 93.17 | 111.8 | 111.8 | 27.0 |
| Plant 8 | 2533 | 2363 | 161.8 | 88.20 | 105.9 | 105.9 | 26.2 |

The effect of draw ratio was further investigated in production scale studies on a double 10 bubble biaxial orientation line. Extrusion was carried out with all extruders except the EVOH layer between 210-265° C., with the die set to 245° C. and the EVOH extruder at 190-230° C. The cast tube was then chilled simultaneously internally and externally to control the level of crystallinity. The cast tube was then reheated and blown under standard BOPP orientation conditions (150-160° C.). In each case the EVOH used was 15 SP521. The draw ratio for each sample was 7.7×8.0 and the results are presented in Tables 12 & 13. The overall film structure is the form ABCDCBA. Where the A layer is a thin heat seat layer, B is a polypropylene (approx. 75% of Total Structure), C layer is a tie layer (approx. 14% of Total Structure) and the D layer is EVOH (approx. 10% Total Structure).

TABLE 12

Production Scale—Optics, Barrier Results EVOH Barrier layer—ASTM Test Method D3985-17 & F1927-14 & Shrinkage results ASTM D2732-08

| Sample | Film Thickness (μm) | EVOH Thickness Microscope Sections | OTR Barrier @ 50% RH, 23° C. (cm³/m²/24 hr) | Optics 45° C. Gloss | WAH | NAH Low | High | Clarity | Shrinkage 130° C. MD | TD |
|---|---|---|---|---|---|---|---|---|---|---|
| Plant 9 | 28 | 2.3 | 0.8 | 95.6 | 1.73 | 9.0 | 14.1 | 91.4 | 6.84 | 2.74 |
| Plant 10 | 29 | 2.4 | 0.8 | 95.9 | 1.63 | 9.5 | 13.0 | 91.4 | 6.55 | 2.55 |
| Plant 11 | 28 | 2.6 | 0.6 | 95.6 | 1.80 | 9.6 | 14.7 | 91.0 | 6.12 | 3.14 |

TABLE 13

Production Scale—Tensile Results—ASTM Test Method D882-12

| Sample | Youngs Modulus (Mpa) | Secant Modulus (Mpa) | 1% Ten Str (Mpa) | Elong @ brk (%) | Max Load (N) | Load @ brk (N) | Thickness (μm) |
|---|---|---|---|---|---|---|---|
| Tensiles, MD | | | | | | | |
| Plant 9 | 3116 | 3028 | 214 | 79 | 135 | 135 | 25 |
| Plant 10 | 2976 | 2923 | 212 | 84 | 134 | 134 | 25 |
| Plant 11 | 3062 | 3014 | 211 | 76 | 131 | 131 | 25 |
| Tensiles, TD | | | | | | | |
| Plant 9 | 2757 | 2609 | 190 | 96 | 121 | 121 | 25 |
| Plant 10 | 2726 | 2591 | 186 | 94 | 119 | 119 | 26 |
| Plant 11 | 2870 | 2707 | 190 | 94 | 117 | 117 | 25 |

The invention claimed is:

1. A multi-layer polymeric film substrate comprising at least a core layer and a coextruded oxygen barrier layer wherein the film exhibits an oxygen transmission rate (OTR) when measured in accordance with ASTM F1927-14 of below 200 cc/m²24 hr at a relative humidity (RH) of 85% and/or of below 600 cc/m²/24 hr at a relative humidity (RH) of 90%, wherein the film has been biaxially oriented at a temperature from 145° C. to 170° C. using a bubble process, such that the crystallinity of the oxygen barrier layer is enhanced wherein the oxygen barrier layer exhibits balanced strain-induced crystallinity, and wherein the oxygen barrier layer comprises Ethylene Vinyl Alcohol (EVOH).

2. The multi-layer polymeric film substrate according to claim 1, having one or more of the following properties:
   (a) a modulus of elasticity in the machine direction (MD) of above 1500/mm²,
   (b) a modulus of elasticity in the transverse direction (TD) of above 1500/mm²,
   (c) shrinkage in the machine direction (MD) of below 15%; and
   (d) shrinkage in the transverse direction (TD) of below 15%.

3. The multi-layer polymeric film substrate according to claim 2, having two or more of the properties (a) to (d).

4. The multi-layer polymeric film substrate according to claim 3, having three or more of the properties (a) to (d).

5. The multi-layer polymeric film substrate according to claim 4, having all four of the properties (a) to (d).

6. The multi-layer polymeric film substrate according to claim 1, wherein the core layer of the film comprises a substantially pure isotactic homopolymer.

7. The multi-layer polymeric film substrate according to claim 1, wherein during manufacture of the film substrate the oxygen barrier layer and the core layer have together been simultaneously stretched in both the machine and transverse directions of the film to over twenty five times the original areal dimensions of the film pertaining immediately before stretching.

8. The multi-layer polymeric film substrate according to claim 7, wherein during manufacture of the film substrate the oxygen barrier layer and the core layer have together been simultaneously stretched in both the machine and transverse directions of the film to over 50 times the original areal dimensions of the film pertaining immediately before stretching.

9. The multi-layer polymeric film substrate according to claim 1, wherein during manufacture of the film substrate the oxygen barrier layer is stretched at a temperature lower than the melting point of the oxygen barrier layer material.

10. A multi-layer polymeric film substrate according claim 1, wherein during manufacture of the film substrate the oxygen barrier layer is stretched in a solid state.

11. The multi-layer polymeric film substrate according to claim 1, wherein during manufacture of the film substrate the oxygen barrier layer and the core layer have together been subjected to a balanced machine and transverse direction draw, either simultaneously or sequentially, to more than 25 times the original areal dimensions, or to 36 or more times the original areal dimensions, or to 49 or more times the original areal dimensions, of the film pertaining immediately before stretching.

12. The multi-layer polymeric film substrate according to claim 1, wherein the film core layer comprises a polyolefin film.

13. The multi-layer polymeric film substrate according to claim 12, wherein the film core layer comprises BOPP.

14. The multi-layer polymeric film substrate according to claim 1, wherein the OTR of the film when measured in accordance with ASTM F1927-14 is below 175 cc/m$^2$/24 hr at a relative humidity (RH) of 85%, below 150 cc/m$^2$/24 hr at a relative humidity (RH) of 85%, below 125 cc/m$^2$/24 hr at a relative humidity (RH) of 85%, below 100 cc/m$^2$/24 hr at a relative humidity (RH) of 85%, below 75 cc/m$^2$ /24 hr at a relative humidity (RH) of 85%, below 50 cc/m$^2$/24 hr at a relative humidity (RH) of 85%, below 30 cc/m$^2$/24 hr at a relative humidity (RE) of 85%, below 600 cc/m$^2$/24 hr at a relative humidity (RH) of 90%, below 500 cc/m$^2$/24 hr at a relative humidity (RH) of 90%, below 400 cc/m$^2$/24 hr at a relative humidity (RH) of 90%, below 300 cc/m$^2$/24 hr at a relative humidity (RH) of 90%, below 200 cc/m$^2$/24 hr at a relative humidity (RH) of 90%, below 100 cc/m$^2$/24 hr at a relative humidity (RH) of 90%, and/or below 50 cc/m$^2$/24 hr at a relative humidity (RH) of 90%.

15. The multi-layer polymeric film substrate according to claim 1, wherein the film substrate is transparent.

16. The multi-layer polymeric film substrate according to claim 1, wherein the film substrate exhibits a wide angle haze (WAH) value of less than about 5, less than about 4, less than about 3 or less than about 2.

17. The A multi-layer polymeric film substrate according to claim 1, wherein the film substrate exhibits a gloss value (at 45°) of at least about 75, at least about 80, at least about 85 or at least about 90.

18. The multi-layer polymeric film substrate according to claim 1, wherein the thickness of the barrier layer is in the range of from about 0.1 μm to about 5 μm.

19. The multi-layer polymeric film substrate according to claim 1, wherein the thickness of the film is from about 10 to about 240 μm.

20. The multi-layer polymeric film substrate according to claim 1, wherein the film substrate is provided with a functional and/or aesthetic coating.

21. The multi-layer polymeric film comprising the film substrate according to claim 1, wherein the film substrate is provided with one or more sealable skin layers.

22. A sealed package formed at least in part from the multi-layer polymeric film substrate according to claim 1.

23. An article of commerce wrapped or packaged in a material comprising the multi-layer polymeric film substrate according to claim 1.

* * * * *